(12) United States Patent
Bishop et al.

(10) Patent No.: US 10,841,331 B2
(45) Date of Patent: Nov. 17, 2020

(54) NETWORK QUARANTINE MANAGEMENT SYSTEM

(71) Applicant: International Business Machines Corporation, Armonk, NY (US)

(72) Inventors: David J. Bishop, Labrador (AU); Carsten Hagemann, Ashmore (AU); Pradeep A. Nagaraju, Coomera (AU); Trevor S. Norvill, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 15/846,381

(22) Filed: Dec. 19, 2017

(65) Prior Publication Data

US 2019/0190941 A1   Jun. 20, 2019

(51) Int. Cl.
*H04L 29/06* (2006.01)
*G06N 20/00* (2019.01)

(52) U.S. Cl.
CPC ......... *H04L 63/1433* (2013.01); *G06N 20/00* (2019.01); *H04L 63/0209* (2013.01); *H04L 63/0263* (2013.01); *H04L 63/1441* (2013.01)

(58) Field of Classification Search
CPC ............. H04L 63/1433; H04L 63/1408; H04L 63/1425; H04L 63/0263
See application file for complete search history.

(56) References Cited

U.S. PATENT DOCUMENTS

| | | | | |
|---|---|---|---|---|
| 8,365,292 B2 * | 1/2013 | Yalakanti | ............ | H04L 63/1408 726/25 |
| 9,306,962 B1 * | 4/2016 | Pinto | ................... | H04L 63/1416 |
| 10,320,813 B1 * | 6/2019 | Ahmed | ............... | H04L 63/1441 |
| 2009/0144216 A1 * | 6/2009 | Zhou | ................... | H04L 63/1416 706/47 |
| 2009/0187968 A1 * | 7/2009 | Roese | ................. | H04L 41/0893 726/1 |
| 2012/0117654 A1 * | 5/2012 | Yalakanti | ............ | H04L 63/1408 726/25 |

(Continued)

FOREIGN PATENT DOCUMENTS

| | | |
|---|---|---|
| EP | 3009949 A1 | 4/2016 |
| WO | WO2015084313 A1 | 6/2015 |

OTHER PUBLICATIONS

IBM, "Get next-generation defenses with IBM QRadar Network Security (XGS); Guard your network with security that goes far beyond pattern-based detection," IBM Security White Paper, copyright 2017, 9 pages. https://public.dhe.ibm.com/common/ssi/ecm/wg/en/wgw03293usen/WGW03293USEN.PDF.

(Continued)

*Primary Examiner* — Ponnoreay Pich
(74) *Attorney, Agent, or Firm* — Yee & Associates, P.C.

(57) ABSTRACT

A method for managing quarantines. A quarantine triggered by a network access policy is detected by a computer system. A determination is made by the computer system of whether to enforce a quarantine rule for the quarantine utilizing a quarantine enforcement model trained utilizing a machine-learning process to classify quarantine rules in response to detecting the quarantine rule. The quarantine is deactivated by the computer system when the quarantine rule is classified as inappropriate such that a risk of a threat is balanced with a group of operational considerations.

20 Claims, 9 Drawing Sheets

(56) References Cited

U.S. PATENT DOCUMENTS

| | | | | |
|---|---|---|---|---|
| 2014/0331280 | A1* | 11/2014 | Porras | H04L 63/20 |
| | | | | 726/1 |
| 2015/0128248 | A1* | 5/2015 | Paul | H04L 63/20 |
| | | | | 726/14 |
| 2015/0222667 | A1* | 8/2015 | Nayshtut | G06N 5/025 |
| | | | | 726/1 |
| 2016/0205143 | A1* | 7/2016 | Bryson | H04L 63/205 |
| | | | | 726/1 |
| 2016/0218933 | A1* | 7/2016 | Porras | H04L 63/20 |
| 2016/0352765 | A1* | 12/2016 | Mermoud | H04L 63/1425 |
| 2017/0111391 | A1 | 4/2017 | Chao et al. | |
| 2017/0357807 | A1* | 12/2017 | Harms | G06N 20/00 |
| 2018/0018590 | A1* | 1/2018 | Szeto | G16H 50/20 |
| 2019/0014086 | A1* | 1/2019 | Meyer | H04L 63/0236 |
| 2019/0089595 | A1* | 3/2019 | Kaplan Haelion | H04L 41/16 |
| 2019/0188603 | A1* | 6/2019 | Cirit | G06N 20/00 |
| 2019/0190941 | A1* | 6/2019 | Bishop | H04L 63/1441 |

OTHER PUBLICATIONS

Trend Micro, "Threat Protection System—TPS; Comprehensive network security through actionable security intelligence," Threat Protection System, Cyber Threat Solutions, copyright 2017, 11 pages. https://www.trendmicro.com/en_us/business/products/network/integrated-atp/threat-protection-system.html.

* cited by examiner

NETWORK QUARANTINE MANAGEMENT SYSTEM

BACKGROUND

1. Field

The disclosure relates generally to improve data processing systems and, more specifically, to a method, a system, and a computer program product for managing policies used to perform quarantine actions in a network.

2. Description of the Related Art

Many different types of systems are present to protect data processing systems, computers, and networks from malware. For example, an intrusion detection system, an intrusion prevention system, and other types of systems may be implemented in a network to provide network security. These types of systems can provide tact against known and unknown threats. An unknown threat may include a zero-day attack, a mutated threat, or some other type of malicious action.

For example, network traffic may be monitored using a network access policy. The network access policy can set rules down to the user and application action levels to reduce risk of exposure. The network access policy can be used to detect and block threats. This policy can be implemented in a network protection device or appliance. The device can evaluate network traffic against the network access policy. The rules in the network access policy are enforced in line. Traffic can be blocked when appropriate. Additionally, the network protection device can trigger a quarantine. For example, a quarantine rule can be created to quarantine a particular application, computer, network device, subnet, or some other portion of a network.

These quarantine rules, however, do not take into account real-world considerations for which a quarantine rule is created. Administrators can create complex quarantines that take these considerations. Creating these rules to take into account particular networks is a lengthy implementation process. This type of approach becomes difficult to administer, maintain, and manage in large enterprise environments because of the complex relationships between the different rules. As a result, interruption of critical services can occur due to an overly complex policy generated by administrators.

Therefore, it would be desirable to have a method and apparatus that take into account at least some of the issues discussed above, as well as other possible issues. For example, it would be desirable to have a method and apparatus that overcome a technical problem with enforcing quarantines.

SUMMARY

According to one embodiment of the present invention, a method for managing quarantines is presented. A quarantine triggered by a network access policy is detected by a computer system. A determination is made by the computer system of whether to enforce a quarantine rule for the quarantine utilizing a quarantine enforcement model trained utilizing a machine-learning process to classify quarantine rules in response to detecting the quarantine rule. The quarantine is deactivated by the computer system when the quarantine rule is classified as inappropriate such that a risk of a threat is balanced with a group of operational considerations.

According to another embodiment of the present disclosure, a quarantine system comprising a computer system, a quarantine enforcement model, and a quarantine evaluator running on the computer system is presented. The quarantine enforcement model is trained to classify quarantine rules utilizing a machine-learning process. The quarantine evaluator detects a quarantine triggered by a network access policy; determines whether to enforce a quarantine rule for the quarantine utilizing the quarantine enforcement model in response to detecting the quarantine rule; and deactivates the quarantine when the quarantine rule is classified as inappropriate such that a risk of a threat is balanced with a group of operational considerations.

According to yet another embodiment of the present disclosure, a computer program product for managing quarantines is presented. The computer program product is comprised of a computer-readable storage media, which stores first program code, second program code, and third program code. The first program code detects a quarantine triggered by a network access policy. The second program code determines whether to enforce a quarantine rule for the quarantine utilizing a quarantine enforcement model trained utilizing a machine-learning process to classify quarantine rules in response to detecting the quarantine rule. The third program code deactivates the quarantine when the quarantine rule is classified as inappropriate such that a risk of a threat is balanced with a group of operational considerations.

DETAILED DESCRIPTION

Figure 1:
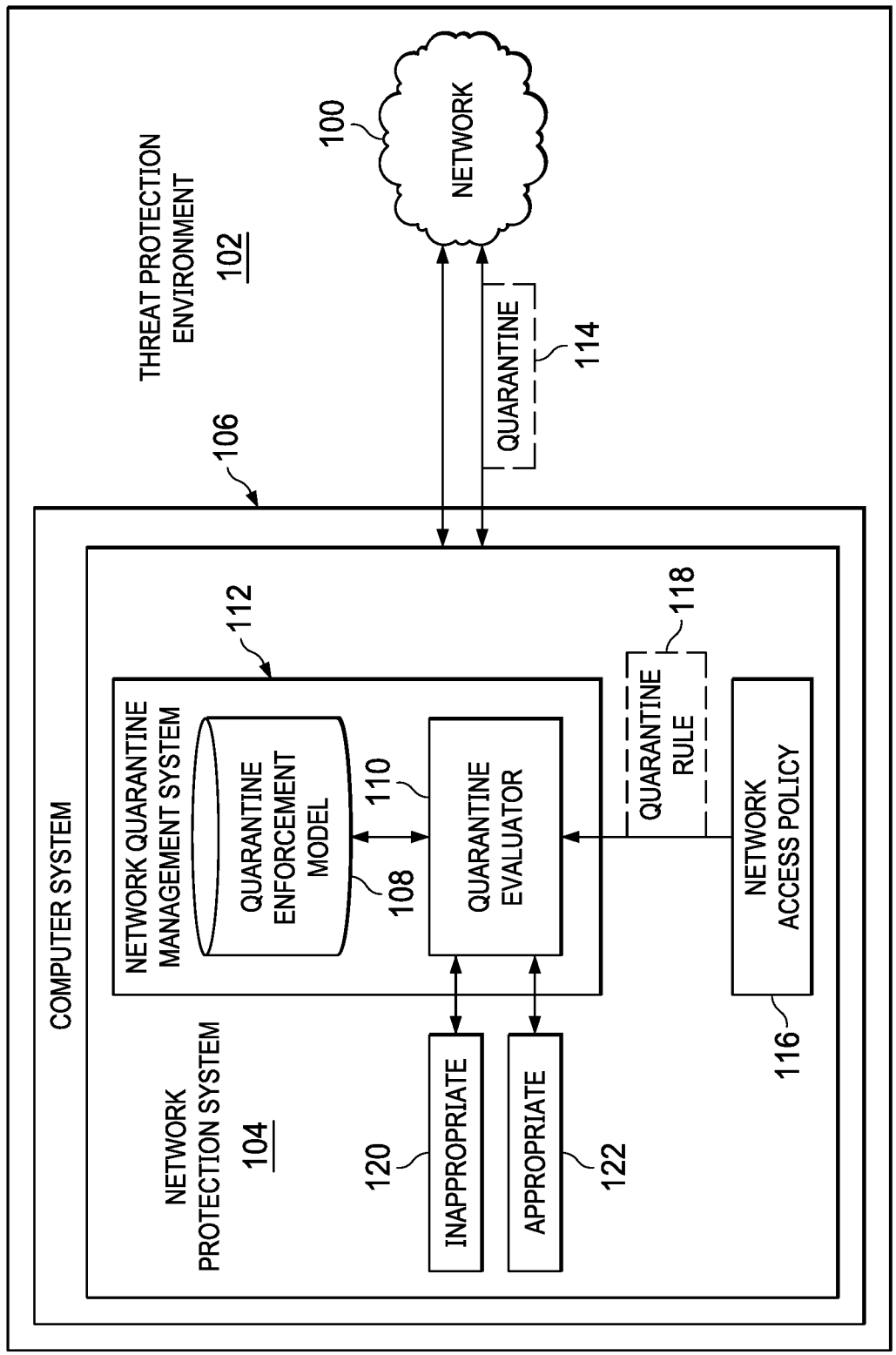
FIG. 1 is an illustration of a threat protection environment in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that currently available security systems are unable to provide a desired level of protection taking into account operational considerations for a particular network. The illustrative embodiments recognize and take into account that existing intrusion protection systems provide a capability to automatically generate quarantine rules that isolate the response of a system to threats. The illustrative embodiments recognize and take into account that these quarantine rules do not take into account operational considerations such as business criticality of the service and the risk of a threat. For example, the illustrative embodiments recognize and take into account that quarantine rules currently do not take into account factors such as demand for the server in a network for which a quarantine rule is created.

Thus, the illustrative embodiments provide a method, an apparatus, a computer system, and a computer program product for managing quarantines. In one illustrative example, a process implemented in a computer system detects a quarantine triggered by a network access policy. The determination is made as whether to enforce a quarantine rule for the quarantine utilizing a quarantine enforcement model trained utilizing a machine-learning process to classify quarantine rules in response to detecting the quarantine rule. The quarantine is deactivated when the quarantine rule is classified as inappropriate such that the risk of the threat is balanced with a group of operational considerations. As used herein, "a group of," when used with reference to items means one or more items. For example, "a group of operational considerations" is one or more operational considerations.

With reference now to the figures and, in particular, with reference to FIG. 1, an illustration of a threat protection environment is depicted in accordance with an illustrative embodiment. As depicted, network 100 in threat protection environment 102 is protected by network protection system 104 running on computer system 106. In this illustrative example, network 100 comprises data processing systems that are in communication with each other utilizing a communications medium. Network 100 may take various forms. Network 100 may include at least one of a local area network (LAN), a wide area network (WAN), a metropolitan area network (MAN), an intranet, the Internet, or some other suitable type of network or grouping of data processing systems.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Computer system 106 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In this illustrative example, network protection system 104 includes quarantine enforcement model 108 and quarantine evaluator 110. As depicted, quarantine evaluator 110 and quarantine enforcement model 108 form network quarantine management system 112.

Quarantine enforcement model 108 is trained to classify quarantine rules utilizing a machine-learning process. As depicted, quarantine evaluator 110 is configured to detect quarantine 114 triggered by network access policy 116. Quarantine evaluator 110 determines whether to enforce quarantine rule 118 for quarantine 114 utilizing quarantine enforcement model 108 in response to detecting quarantine rule 118 being activated for network 100 to enforce quarantine 114.

As depicted, quarantine 114 is applied to a portion of network 100. This portion of network 100 may be selected from at least one of a network device, a switch, a computer, a firewall appliance, a web server, a file server, a group of computers, a subnet, a local area network (LAN) within network 100, or some other portion of network 100.

Quarantine evaluator 110 deactivates quarantine 114 when quarantine rule 118 is classified as inappropriate 120 such that a risk of a threat is balanced with a group of operational considerations. When quarantine rule 118 is classified as appropriate 122 by quarantine evaluator 110 utilizing quarantine enforcement model 108, quarantine rule 118 remains active to enforce quarantine 114 in network 100.

Quarantine evaluator 110 can be implemented in software, hardware, firmware, or a combination thereof. When software is used, the operations performed by quarantine evaluator 110 may be implemented in program code configured to run on hardware, such as a processor unit. When firmware is used, the operations performed by quarantine evaluator 110 may be implemented in program code and data and stored in persistent memory to run on a processor unit. When hardware is employed, the hardware may include circuits that operate to perform the operations in quarantine evaluator 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 2:
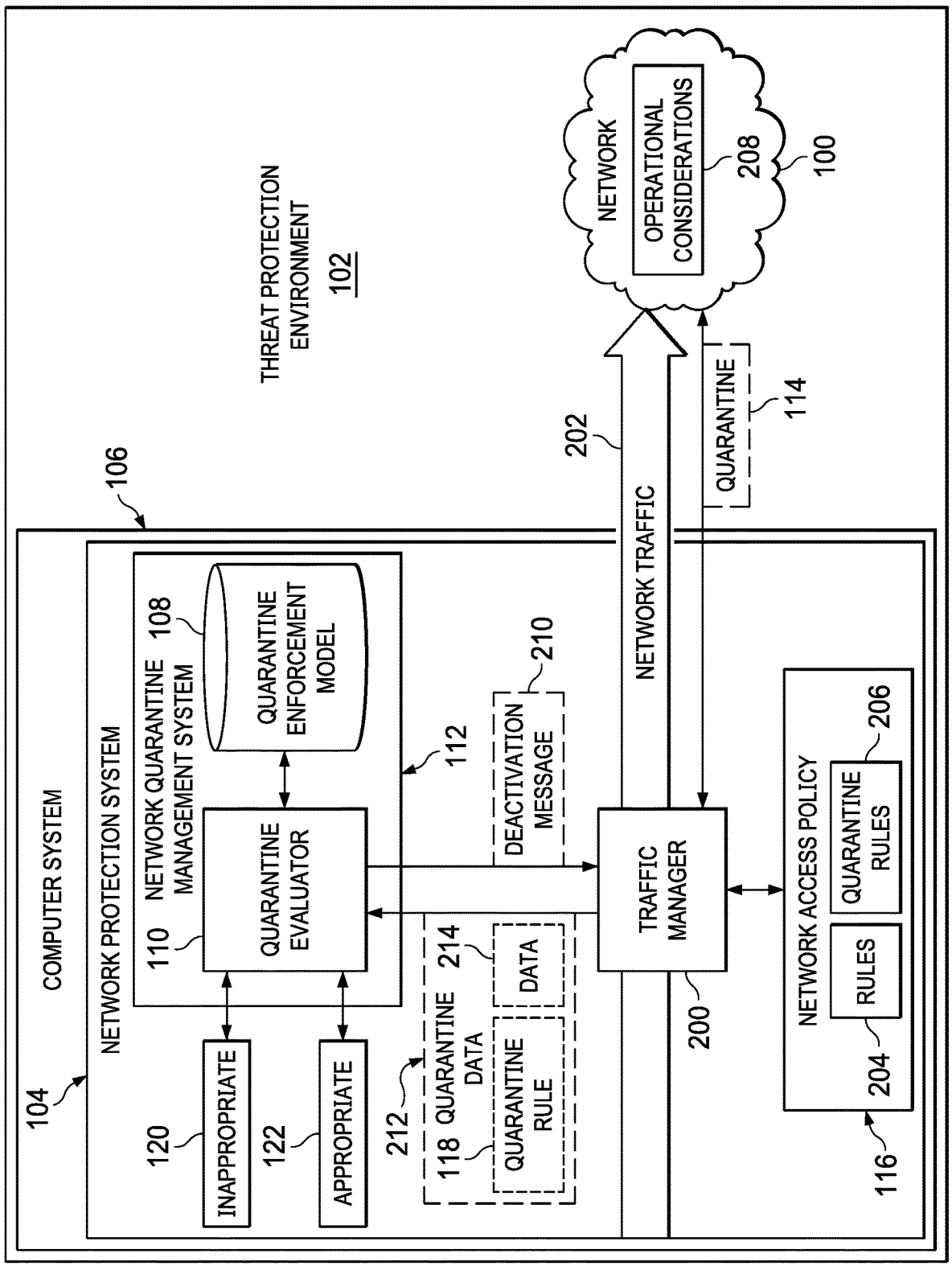
FIG. 2 is a data flow diagram for protecting a network in accordance with an illustrative embodiment.

With reference next to FIG. 2, a data flow diagram for protecting a network is depicted in accordance with an illustrative embodiment. In the illustrative examples, the same reference numeral may be used in more than one figure. This reuse of a reference numeral in different figures represents the same element in the different figures.

In this illustrative example, the data flow diagram depicts data flow that occurs in protecting network 100 from potential threats. As depicted, traffic manager 200 is configured to monitor network traffic 202 in network 100. Traffic manager 200 monitors network traffic 202 as network traffic 202 flows through traffic manager 200. For example, traffic manager 200 compares network traffic 202 against network access policy 116. For example, traffic manager 200 determines whether to initiate quarantine such as quarantine 114 based on quarantine rule 118 in network access policy 116.

Traffic manager 200 is configured to selectively block network traffic 202 for quarantine 114 based on quarantine rule 118.

As depicted, traffic manager 200 can be implemented using a number of different types of currently available threat protection systems. For example, traffic manager 200 may be implemented using QRadar Network Security (XGS), which is available from International Business Machines Corporation.

The monitoring is performed by traffic manager 200 utilizing network access policy 116. Network traffic 202 is evaluated against network access policy 116. In this illustrative example, rules 204 within network access policy 116 are utilized to determine whether a portion of network traffic 202 should be blocked. In this illustrative example, rules 204 and network access policy 116 are enforced in-line.

For example, with in-line enforcement, network access policy 116 is utilized to enforce an access control policy that is applied "on the wire," such as at layer 2, which is also referred to as a data link layer in a seven-layer Open Systems Interconnection (OSI) model of computer networking. At this level, traffic manager 200 has full access to the communications and can evaluate threats utilizing network access policy 116 and optionally take action while data packets are passing through traffic manager 200.

Additionally, network access policy 116 includes quarantine rules 206. One or more of quarantine rules 206 can be triggered when applying rules 204 in network access policy 116 to network traffic 202. In this illustrative example, traffic manager 200 also operates to enforce or apply quarantine rule 118 to implement quarantine 114. For example, traffic manager 200 compares network traffic 202 to quarantine rule 118. The comparison is used to determine how to handle network traffic 202. For example, a portion of network traffic 202 can be blocked from some portion of network 100 based on applying quarantine rule 118 to network traffic 202.

As depicted, when quarantine rule 118 is generated by traffic manager 200 to trigger quarantine 114, quarantine data 212 is sent to quarantine evaluator 110. Quarantine data 212 includes quarantine rule 118 in this illustrative example. Additionally, quarantine data 212 also can include data 214. In this illustrative example, data 214 includes information about quarantine 114.

As depicted, quarantine evaluator 110 determines whether quarantine rule 118 should be applied to enforce quarantine 114 for network 100. This determination is made utilizing quarantine rule 118 and quarantine enforcement model 108. In the illustrative example, data 214 also may be utilized with quarantine rule 118 in evaluating quarantine 114 utilizing quarantine enforcement model 108.

As depicted, quarantine enforcement model 108 is trained to take into account a group of operational considerations 208 for network 100. Operational considerations 208 include considerations that are specific for network 100. In other words, operational considerations 208 may differ for other networks. Further, the group of operational considerations 208 may be different for different portions of network 100. For example, the group of operational considerations 208 for a switch in network 100 may be different from the group of operational considerations 208 for a Web server in network 100. As another illustrative example, the group of operational considerations 208 can be different for different Web servers based on the criticality of those Web servers, traffic, and other considerations for each of the Web servers. Further, the group of operational considerations 208 can be based on time of day, day of the week, month, or some other 100 may change over time resulting in the group of operational considerations 208 for that server also changing.

In this manner, quarantine enforcement model 108 and quarantine evaluator 110 operate to provide a technical effect of taking into account operational considerations 208 for network 100 in deciding whether to enforce quarantine 114. Further, this decision can also take into account operational considerations 208 for a particular component in network 100. The component can be selected from a group comprising the data processing system, a computer, an application, an operating system, a port, a switch, or some of component within network 100.

In response to receiving quarantine rule 118, quarantine evaluator 110 determines whether quarantine rule 118 should be applied to enforce quarantine 114 utilizing quarantine enforcement model 108. In this depicted example, quarantine enforcement model 108 takes into account the group of operational considerations 208 for network 100. As depicted, quarantine enforcement model 108 can be used to classify quarantine rule 118 as being inappropriate 120 or appropriate 122 in this illustrative example.

In this illustrative example, the determination as to whether quarantine rule 118 is appropriate or inappropriate can be made using an output from quarantine enforcement model 108. This output can take the form of a value for the probability of how appropriate quarantine rule 118 is for enforcing quarantine 114. For example, the value can be a value between 0 and 1. With this type of implementation, a threshold can be set up to determine when to enforce action. This threshold can be utilized by quarantine evaluator 110 to indicate whether quarantine rule 118 is inappropriate 120 or appropriate 122. For example, the threshold can be set to 0.5 in one example. Of course, all threshold levels can use depending on the particular limitation. A value greater than the threshold indicates that quarantine rule 118 is appropriate 122 and should be enforced.

In this manner, quarantine evaluator 110 can determine whether quarantine rule 118 should be deactivated. If quarantine rule 118 is to be deactivated, quarantine evaluator 110 sends deactivation message 210 to traffic manager 200. Deactivation message 210 identifies which quarantine rule should be deactivated. If quarantine rule 118 is not to be deactivated, no message is sent by quarantine evaluator 110.

Figure 3:
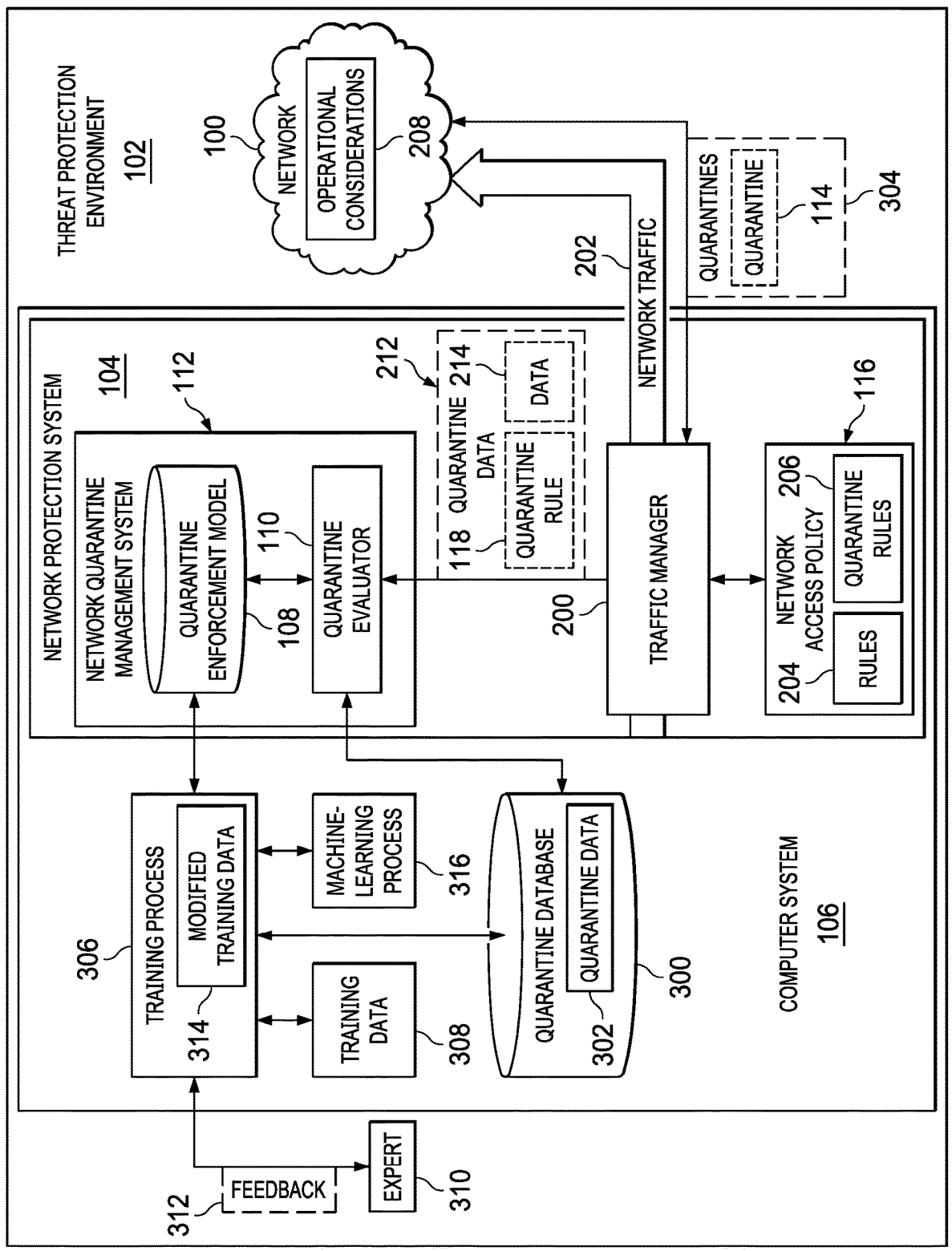
FIG. 3 is a data flow diagram for training a quarantine enforcement model in accordance with an illustrative embodiment.

With reference now to FIG. 3, a data flow diagram for training a quarantine enforcement model is depicted in accordance with an illustrative embodiment. In this illustrative example, quarantine database 300 stores quarantine data 302 relevant to quarantines 304 enforced for network 100 for use in training quarantine enforcement model 108. Quarantines 304 may be current or past quarantines for network 100.

For example, quarantine evaluator 110 stores quarantine data 212 in quarantine database 300 as quarantine data 302. Quarantine data 212 comprises quarantine rule 118 and data 214 relevant to quarantine 114 received from traffic manager 200 in quarantine database 300 as part of quarantine data 302. Quarantine data 302 is data for quarantines 304 for network 100. In this illustrative example, quarantine data 302 can include at least one of network event data that triggered quarantines 304, quarantine details describing the scope of quarantines 304, quarantine 114 for quarantines 304, and quarantine rules 206 used to enforce quarantines 304.

As depicted, training process 306 creates training data 308 from quarantine data 302 for quarantine 114 in quarantine database 300. As depicted, training process 306 modifies training data 308 using feedback 312 from expert 310 to form modified training data 314. Training process 306 trains quarantine enforcement model 108 to classify quarantine rule 118 utilizing modified training data 314 and machine-learning process 316.

Additionally, training process 306 can present quarantine data 302 to quarantines 304 to expert 310 and receive feedback 312. As depicted, feedback 312 can be the decision made by expert 310 as to whether quarantine 114 is appropriate. Feedback 312 can be added or utilized to modify training data 308 to form modified training data 314.

As depicted, quarantine data 302 reviewed by expert 310 can include environmental context data such as a threat score, an attacked service, whether high-availability is present, whether a backup system is present, a date and time of events, an IP address of the affected system, a media access control address, a criticality of the system, a subject to which the system belongs, information about network 100, the type of operating system, the operating system version, and other suitable types of network event information. Quarantine details can include the item that was blocked. This item can be, for example, a protocol, a port, an application, or some other item. The quarantine details also may identify who was blocked. This meditation may be made using an Internet protocol address, a segment, or some other information.

As depicted, feedback 312 includes an indication as to whether the decision was appropriate. Feedback 312 can also include inputs considered by expert 310 to generate the indication as to whether the decision was appropriate.

Expert 310 can take a number of different forms. For example, expert 310 may be selected from a group comprising a human administrator, an artificial intelligence system, a subject matter expert, or some other suitable type of expert. When expert 310 is an artificial intelligence system, expert 310 may be selected from a group comprising a natural language processing system, a Bayesian network, a neural network, a fuzzy logic system, or some other suitable type of artificial intelligence system that can be employed to provide feedback 312 utilizing quarantine data 302 presented to the artificial intelligence system.

In this illustrative example, machine-learning process 316 is a process that provides an ability to train quarantine enforcement model 108 without explicitly programming quarantine enforcement model 108. Machine-learning process 316 can be implemented using a number of different approaches. For example, machine-learning process 316 may include at least one of decision tree learning, association rule learning, an artificial neural network, inductive logic programming, a Bayesian network, representation learning, a genetic algorithm, rule-based machine learning, logistic regression, or other suitable types of machine-learning processes that can be used to train quarantine enforcement model 108 to classify quarantine rules. In this illustrative example, machine-learning process 316 takes into account operational considerations 208 for different portions of network 100.

In this illustrative example, the training of quarantine enforcement model 108 can be performed asynchronously from the process implemented in traffic manager 200, quarantine evaluator 110, or both. In this manner, classification of quarantine rules 206 can be created. Further, refinement for quarantine rules 206 in quarantine enforcement model 108 can be made. This type of processing can be performed periodically for all active quarantine rules, once for each quarantine such as at the time the quarantine rule was created, or at other suitable times. In other illustrative examples, the periodic training can be performed for quarantine rules 206 for which training data 308 has been collected.

In one illustrative example, one or more technical solutions are present that overcome a technical problem with enforcing quarantines in a manner that takes into account operational considerations in a network. As a result, one or more technical solutions may provide a technical effect of utilizing a quarantine enforcement model that is trained to take into account operational considerations for quarantine rules that may be used to apply quarantines to a network. Further, one or more technical solutions provides an improved quarantine enforcement model trained utilizing feedback from an expert such as a person or artificial intelligence system.

As a result, computer system 106 operates as a special purpose computer system in which quarantine evaluator 110 in computer system 106 enables managing quarantines 304 in a manner that takes into account operational considerations 208 for network 100. In particular, quarantine evaluator 110 transforms computer system 106 into a special purpose computer system as compared to currently available general computer systems that do not have quarantine evaluator 110.

The illustration of threat protection environment 102 and the different components in this environment in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, traffic manager 200 and quarantine evaluator 110 are shown as separate functional components. These two blocks can be combined into a single component in implementing the processes for these components in software, hardware, or a combination thereof. In another illustrative example, training data 308 is described with respect to quarantine 114 enforced using quarantine rule 118. In other illustrative examples, training data 308 can include data from multiple ones of quarantines 304. When multiple quarantines are present, this data may be presented to expert 310. In response, expert 310 can indicate which quarantines are inappropriate or appropriate for use in creating modified training data 314. Further, one or more networks in addition to or in place of network 100 may be protected by network protection system 104. When more than one network is present, quarantine enforcement model 108 takes into account operational considerations 208 that may be present in the different networks. For example, two networks with the same hardware configurations but different uses may have different results when the same quarantine rule is triggered in both networks when operational considerations 208 are taken into account for these networks.

Figure 4:
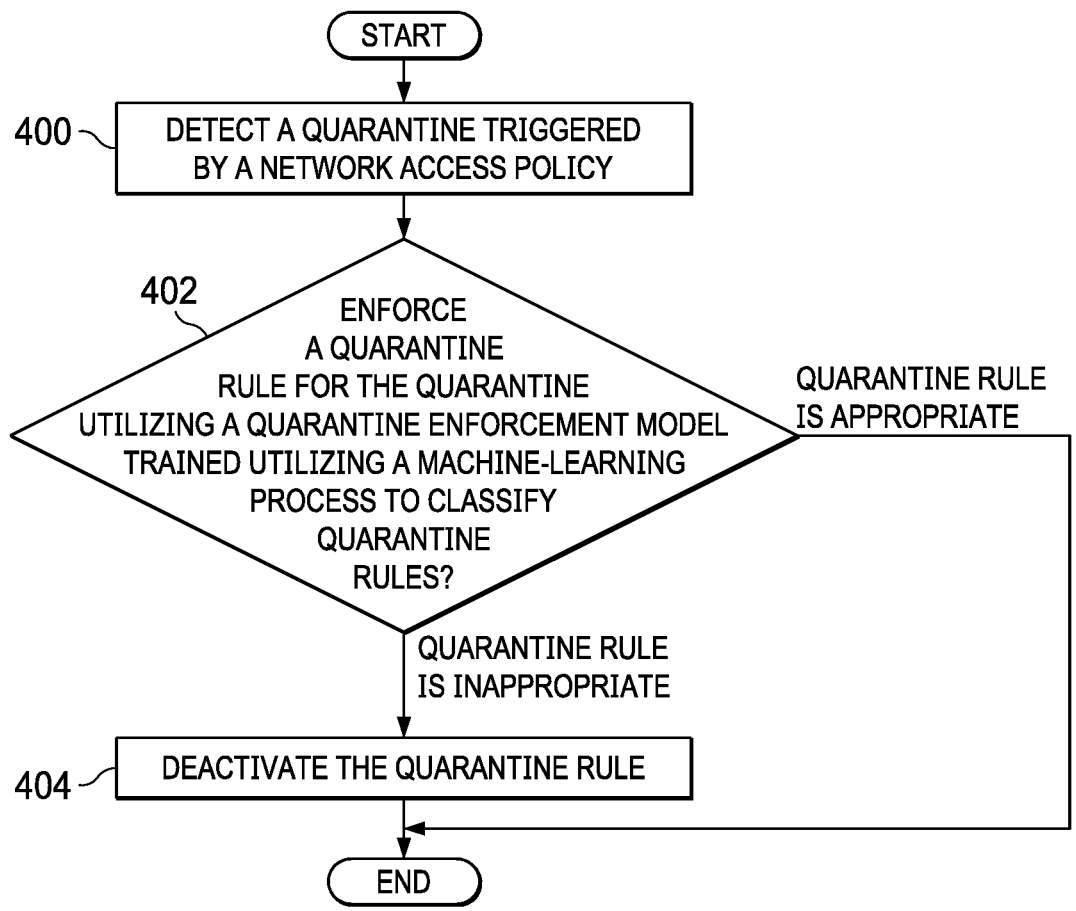
FIG. 4 is a flowchart of a process for managing quarantines in accordance with an illustrative embodiment.

Turning next to FIG. 4, a flowchart of a process for managing quarantines is depicted in accordance with an illustrative embodiment. The process in this flowchart can be implemented in quarantine evaluator 110 running on computer system 106 in FIGS. 1-3. The process can be implemented in at least one of software or hardware in computer system 106. When software is present, program code is present that runs on one or more processor units in computer system 106 to perform the different steps in this process.

The process begins by detecting a quarantine triggered by a network access policy (step 400). The process determines whether to enforce a quarantine rule for the quarantine utilizing a quarantine enforcement model trained utilizing a machine-learning process to classify quarantine rules (step 402). In step 402, a determination is made as to whether the quarantine rule is appropriate or inappropriate.

If the process determines the quarantine rule is inappropriate, the process deactivates the quarantine rule (step 404). In step 404, the quarantine rule is classified as inappropriate such that a risk of a threat is balanced with a group of operational considerations for the network. The process terminates thereafter.

With reference again to step 402, if the process determines that the quarantine rule is appropriate, the process terminates. In this case, no action is taken and the quarantine remains in force.

Figure 5:
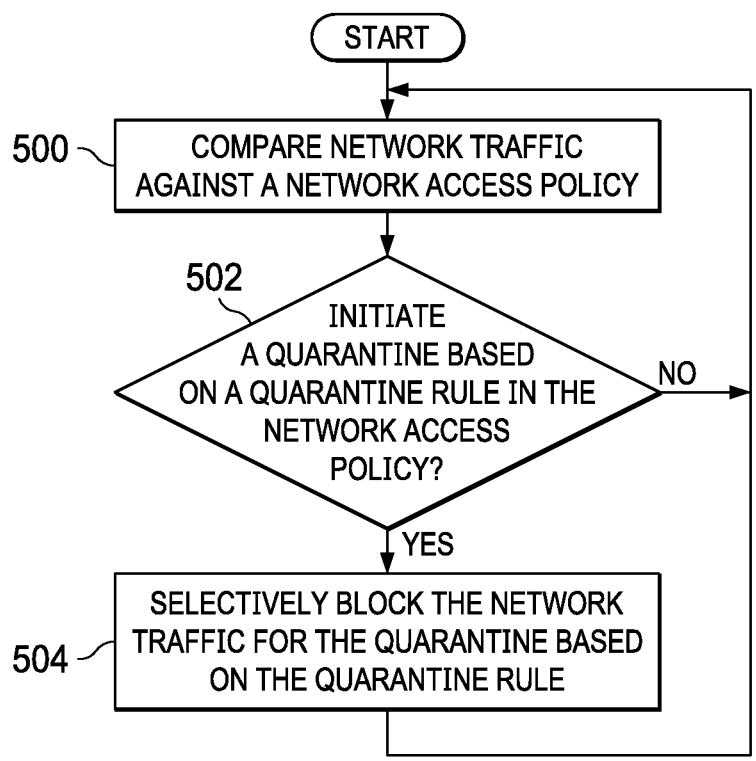
FIG. 5 is a flowchart of a process for monitoring network traffic in accordance with an illustrative embodiment.

Turning to FIG. 5, a flowchart of a process for monitoring network traffic is depicted in accordance with an illustrative embodiment. The process in this flowchart can be implemented in traffic manager 200 running on computer system 106 in FIGS. 2-3. The process can be implemented in at least one of software or hardware in computer system 106. When software is present, program code is present that runs on one or more processor units in computer system 106 to perform the different steps in this process.

The process begins by comparing network traffic against a network access policy (step 500). The process determines whether to initiate a quarantine based on a quarantine rule in the network access policy (step 502).

The process selectively blocks the network traffic for the quarantine based on the quarantine rule (step 504). The process returns to step 500. With reference again to step 502, if the quarantine is not to be initiated, the process also returns to step 500.

Figure 6:
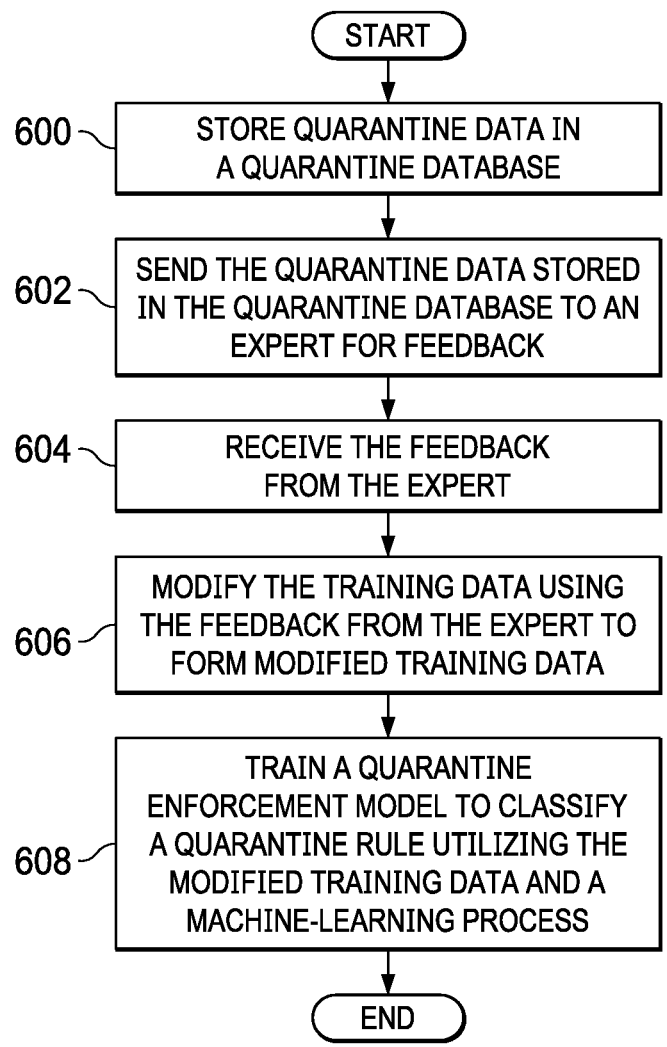
FIG. 6 is a flowchart of a process for training a quarantine enforcement model in accordance with an illustrative embodiment.

With reference now to FIG. 6, a flowchart of a process for training a quarantine enforcement model is depicted in accordance with an illustrative embodiment. The process in this flowchart can be implemented in quarantine evaluator 110 running on computer system 106 in FIGS. 1-3. The process can be implemented in at least one of software or hardware in computer system 106. When software is used, program code runs on one or more processor units in computer system 106 to perform the different steps in this process.

The process begins by storing quarantine data in a quarantine database (step 600). The process sends the quarantine data stored in the quarantine database to an expert for feedback (step 602). The process receives the feedback from the expert (step 604). The process modifies the training data using the feedback from the expert to form modified training data (step 606).

The process trains a quarantine enforcement model to classify a quarantine rule utilizing the modified training data and a machine-learning process (step 608). The process terminates thereafter.

Figure 7:
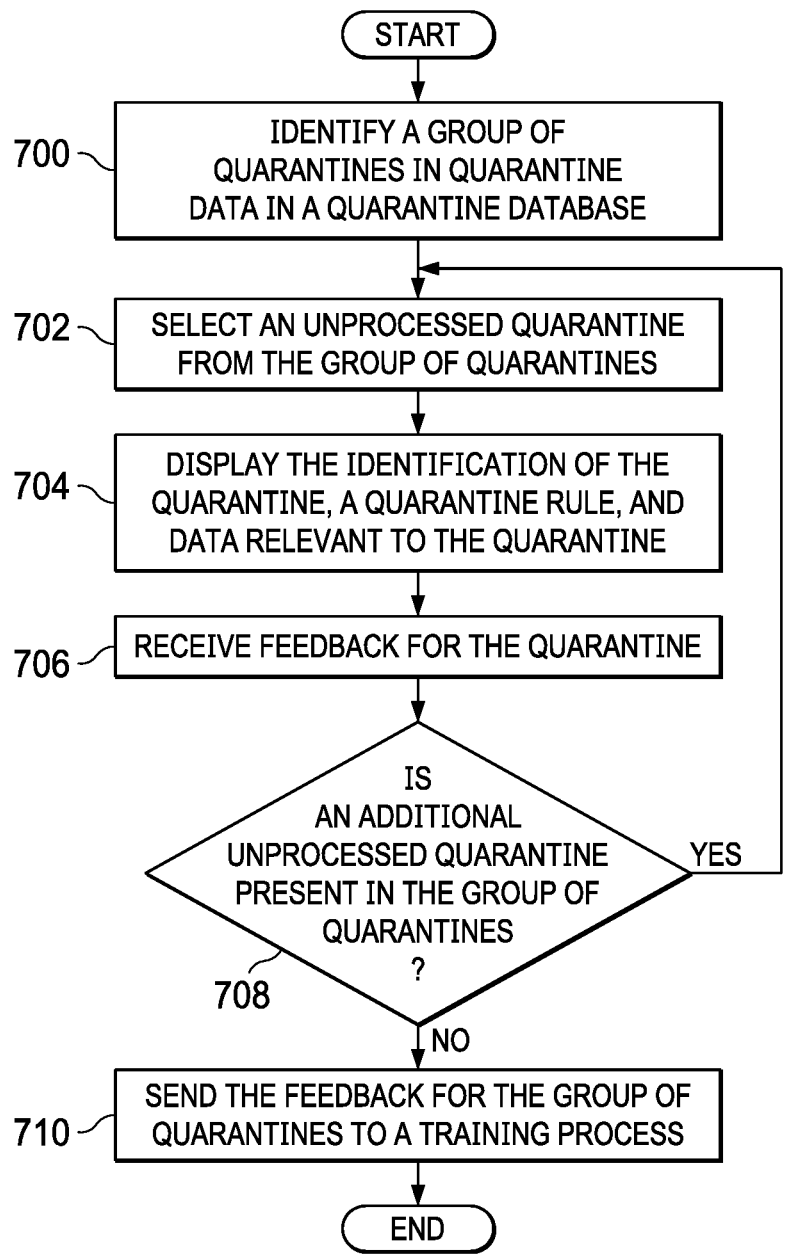
FIG. 7 is a flowchart of a process for obtaining feedback from a person in accordance with an illustrative embodiment.

Turning next to FIG. 7, a flowchart of a process for obtaining feedback from a person is depicted in accordance with an illustrative embodiment. The process can be implemented in at least one of software or hardware and computer system 106 in FIG. 1-3. When software is present, program code is present that runs on one or more processor units in computer system 106 to perform the different steps in this process. This process can be used to obtain feedback from an expert in the form of a human administrator or some other person. This process can be implemented on a data processing system utilized by the person.

The process identifies a group of quarantines in quarantine data in a quarantine database (step 700). The process selects an unprocessed quarantine from the group of quarantines (step 702). The process displays the identification of the quarantine, a quarantine rule, and data relevant to the quarantine (step 704). The process receives feedback for the quarantine (step 706). This feedback can take into account operational considerations for the network. These operational considerations are the ones identified by the expert or may be part of the data for the quarantine.

A determination is made as to whether an additional unprocessed quarantine is present in the group of quarantines (step 708). If an additional unprocessed quarantine is present, the process returns to step 702. Otherwise, the process sends the feedback for the group of quarantines to a training process (step 710). The feedback by the person includes an indication as to whether the quarantine was appropriate. Further, the feedback can also include operational considerations and other data considered by the expert in generating the indication as to whether the quarantine was appropriate. The process terminates thereafter.

Figure 8:
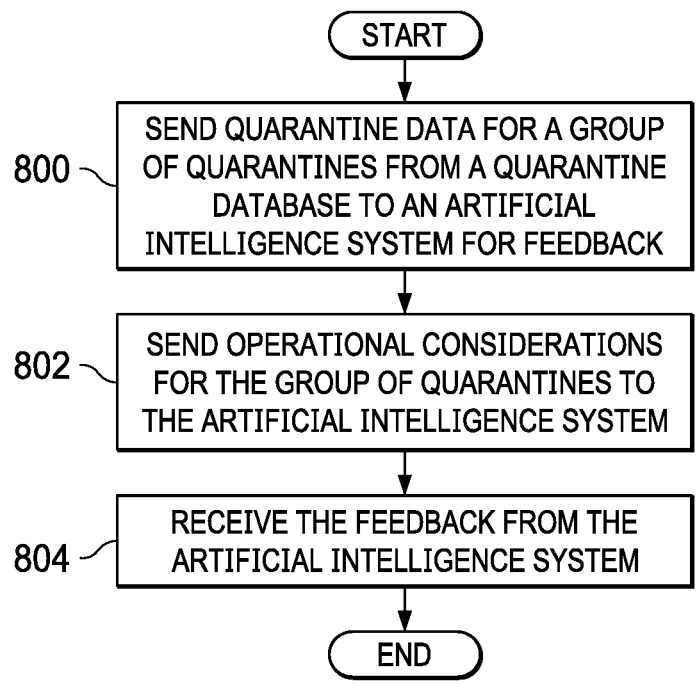
FIG. 8 is a flowchart of a process for obtaining feedback from an artificial intelligence system in accordance with an illustrative embodiment.

With reference now to FIG. 8, a flowchart of a process for obtaining feedback from an artificial intelligence system is depicted in accordance with an illustrative embodiment. The process can be implemented in at least one of software or hardware and computer system 106 in FIGS. 1-3. When software is present, program code is present that runs on one or more processor units in computer system 106 to perform the different steps in this process. This process can be used to obtain feedback from an expert in the form of a human administrator or other person.

The process begins by sending quarantine data for a group of quarantines from a quarantine database to an artificial intelligence system for feedback (step 800). This quarantine data can include an identification of the quarantine, a quarantine rule, and data relevant to the quarantine rule for each quarantine in the group of quarantines. The process sends operational considerations for the group of quarantines to the artificial intelligence system (802). The artificial intelligence system is configured to provide the feedback on whether a quarantine in the group of quarantines is appropriate based on the quarantine data and operational considerations. The process receives the feedback from the artificial intelligence system (step 804). The feedback includes an indication made by the artificial intelligence system as to whether the quarantine was appropriate. Further, the feedback can also include operational considerations and other data considered by the artificial intelligence system in generating the indication as to whether the quarantine was appropriate. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
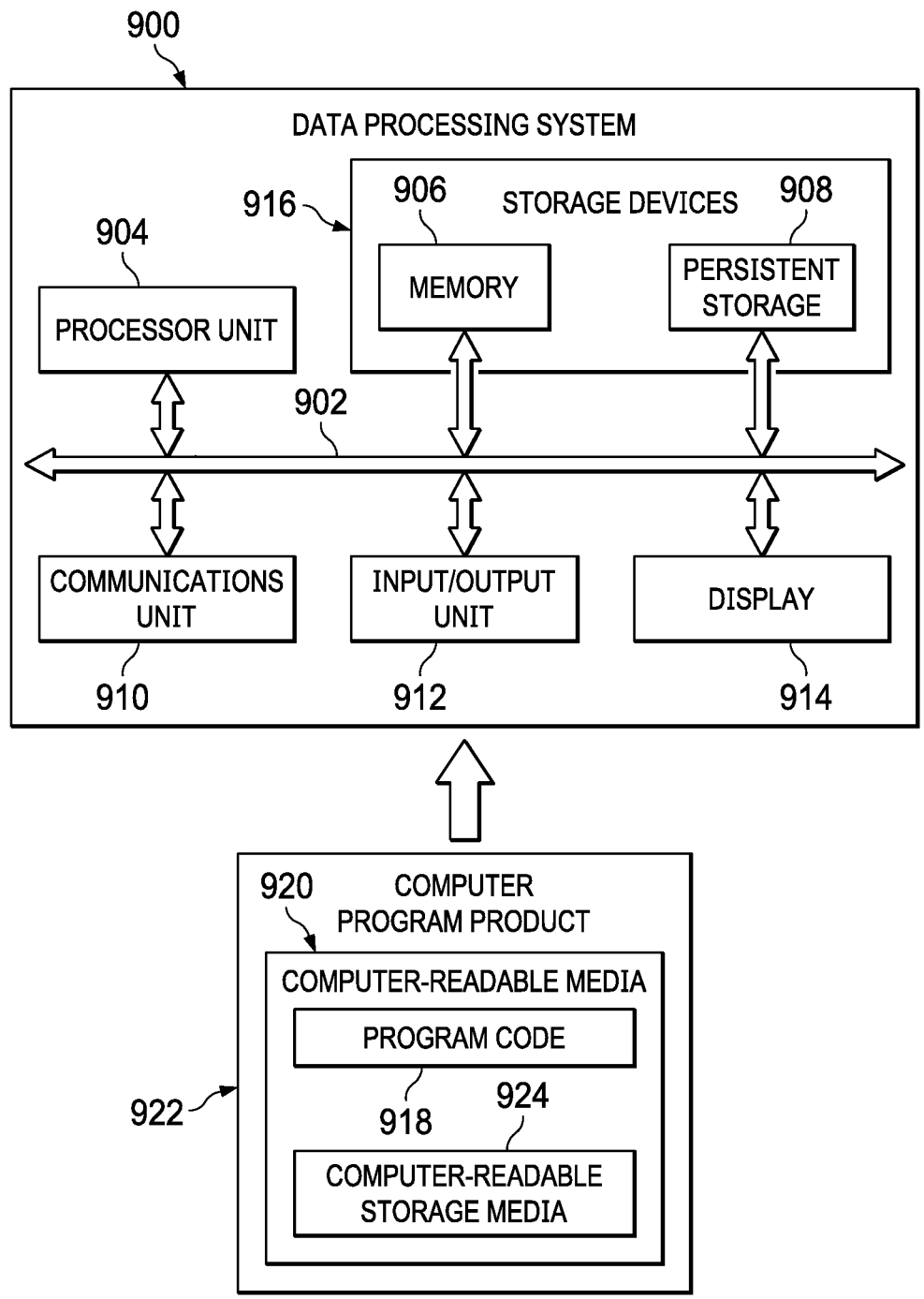
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 106 and different data processing systems within network 100. In this illustrative example, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random-access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid state hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Alternatively, program code 918 may be transferred to data processing system 900 using a computer-readable signal media. The computer-readable signal media may be, for example, a propagated data signal containing program code 918. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, the illustrative embodiments provide a computer-implemented method, a computer system, and a computer program product for managing quarantines. In one illustrative example, a quarantine triggered by network access policy results in a determination being made as to whether to quarantine is appropriate. This determination is made utilizing a quarantine enforcement model that is trained utilizing machine-learning process. The quarantine enforcement model takes into account operational considerations for the network in which the quarantine has been initiated.

In the illustrative example, the quarantine enforcement model is trained utilizing data about the quarantine and feedback from an expert. The expert can take a number of forms. For example, the expert can be a person, an artificial intelligence system, or some other suitable type of expert. In some cases, the feedback can be received from more than one expert.

In this manner, the quarantines can be enforced in a manner that takes into account operational considerations for the network. These operational considerations may include the business availability of the components. Service-level agreements may indicate the amount of availability different components are required to have to meet those service-level agreements.

The training of the quarantine enforcement model is performed in a way that reduces the need for complex rules for quarantines that are generated by human administrators. As a result, the difficulty in administering, maintaining, and managing these complex rules for the quarantines may be reduced or eliminated utilizing the network quarantine management described in the different illustrative examples.

Further, the illustrative examples increase the precision for quarantine decisions because these decisions can take into account the operational considerations for different components in network 100. Further, operational costs can be reduced through reduced complexity of network protection rules requiring subject matter which experts create and test. Additionally, reduced hardware costs can be present utilizing the quarantine enforcement model because hardware required to evaluate quarantine rules are reduced. Further, enforcement of the quarantines may be less error-prone with training of quarantine enforcement model 108 utilizing machine-learning processes and input from the experts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing quarantines, the method comprising:
   detecting, by a computer system, a quarantine triggered by a network access policy;
   determining, by the computer system, whether to enforce a quarantine rule for the quarantine utilizing a quarantine enforcement model trained utilizing a machine-learning process to classify quarantine rules in response to detecting the quarantine rule; and
   deactivating, by the computer system, the quarantine when the quarantine rule is classified as inappropriate such that a risk of a threat is balanced with a group of operational considerations.

2. The method of claim 1 further comprising:
   comparing network traffic against the network access policy;
   determining whether to initiate the quarantine based on the quarantine rule in the network access policy; and
   selectively blocking the network traffic for the quarantine based on the quarantine rule.

3. The method of claim 1 further comprising:
   creating training data utilizing quarantine data for the quarantine;
   modifying the training data using a feedback from an expert to form modified training data; and
   training the quarantine enforcement model to classify the quarantine rule utilizing the modified training data and the machine-learning process.

4. The method of claim 3, wherein modifying the training data using the feedback from the expert to form the modified training data comprises:
   presenting the quarantine data for the quarantine to a human administrator;
   receiving the feedback in a user input from the human administrator for the quarantine; and
   modifying the training data utilizing the feedback from the human administrator to form the modified training data.

5. The method of claim 3, wherein modifying the training data using the feedback from the expert to form the modified training data comprises:
   sending the training data to an artificial intelligence system;
   receiving the feedback from the artificial intelligence system; and
   modifying the training data utilizing the feedback from the artificial intelligence system to form the modified training data.

6. The method of claim 3, wherein the quarantine data about the quarantine comprises network event data that triggered the quarantine, details about the quarantine, and the quarantine rule for the quarantine.

7. The method of claim 1, wherein the machine-learning process is selected from a group comprising a ridge regression algorithm, a linear regression algorithm, a logistic regression algorithm, a least angle regression algorithm, a neural network, a k-nearest neighbor algorithm, a locally weighted learning algorithm, a Bayesian network, an Apriori algorithm, and a radial basis function network.

8. A quarantine system comprising:
   a computer system;
   a quarantine enforcement model trained to classify quarantine rules utilizing a machine-learning process; and
   a quarantine evaluator running on the computer system, wherein the quarantine evaluator detects a quarantine triggered by a network access policy; determines whether to enforce a quarantine rule for the quarantine utilizing the quarantine enforcement model in response to detecting the quarantine rule; and deactivates the quarantine when the quarantine rule is classified as inappropriate such that a risk of a threat is balanced with a group of operational considerations.

9. The quarantine system of claim 8 further comprising:
   a traffic manager on the computer system, wherein the traffic manager compares network traffic against the network access policy; determines whether to initiate the quarantine based on the quarantine rule in the network access policy; and selectively blocks the network traffic for the quarantine based on the quarantine rule.

10. The quarantine system of claim 8 further comprising:
a training process running on the computer system, wherein the training process creates training data utilizing quarantine data for the quarantine; modify the training data using a feedback from an expert to form modified training data; and train the quarantine enforcement model to classify the quarantine rule utilizing the modified training data and the machine-learning process.

11. The quarantine system of claim 10, wherein in modifying the training data using the feedback from the expert to form the modified training data, the training process presents the quarantine data for the quarantine to the expert in a form of a human administrator; receives the feedback from an administrator for the quarantine; and modifies the training data utilizing the feedback from the human administrator to form the modified training data.

12. The quarantine system of claim 10, wherein in modifying the training data using the feedback from the expert to form the modified training data, the training process sends the training data to the expert in a form of an artificial intelligence system; receives the feedback from the artificial intelligence system; and modifies the training data utilizing the feedback from the artificial intelligence system to form the modified training data.

13. The quarantine system of claim 8, wherein the machine-learning process is selected from a group comprising a ridge regression algorithm, a linear regression algorithm, a logistic regression algorithm, a least angle regression algorithm, a neural network, a k-nearest neighbor algorithm, a locally weighted learning algorithm, a Bayesian network, an Apriori algorithm, and a radial basis function network.

14. A computer program product for managing quarantines, the computer program product comprising:
a computer-readable storage media;
first program code, stored on the computer-readable storage media, for detecting a quarantine triggered by a network access policy;
second program code, stored on the computer-readable storage media, for determining whether to enforce a quarantine rule for the quarantine utilizing a quarantine enforcement model is trained utilizing a machine-learning process to classify quarantine rules in response to detecting the quarantine rule; and
third program code, stored on the computer-readable storage media, for deactivating the quarantine when the quarantine rule is classified as inappropriate such that a risk of a threat is balanced with a group of operational considerations.

15. The computer program product of claim 14 further comprising:
fourth program code, stored on the computer-readable storage media, for comparing network traffic against the network access policy;
fifth program code, stored on the computer-readable storage media, for determining whether to initiate the quarantine based on the quarantine rule in the network access policy; and
sixth program code, stored on the computer-readable storage media, for selectively blocking the network traffic for the quarantine based on the quarantine rule.

16. The computer program product of claim 14 further comprising:
fourth program code, stored on the computer-readable storage media, for creating training data utilizing quarantine data for the quarantine;
fifth program code, stored on the computer-readable storage media, for modifying the training data using a feedback from an expert to form modified training data; and
sixth program code, stored on the computer-readable storage media, for training the quarantine enforcement model to classify the quarantine rule utilizing the modified training data and the machine-learning process.

17. The computer program product of claim 16, wherein the fifth program code comprises:
program code, stored on the computer-readable storage media, for presenting the quarantine data for the quarantine to an expert in a form of a human administrator;
program code, stored on the computer-readable storage media, for receiving the feedback from the human administrator for the quarantines; and
program code, stored on the computer-readable storage media, for modifying the training data utilizing the feedback from the human administrator to form the modified training data.

18. The computer program product of claim 16, wherein the fifth program code comprises:
program code, stored on the computer-readable storage media, for sending the training data to an expert in a form of an artificial intelligence system;
program code, stored on the computer-readable storage media, for receiving the feedback from the artificial intelligence system; and
program code, stored on the computer-readable storage media, for modifying the training data utilizing the feedback from the artificial intelligence system to form the modified training data.

19. The computer program product of claim 16, wherein the quarantine data about the quarantine comprises network event data that triggered the quarantine, details about the quarantine, and the quarantine rule for the quarantine.

20. The computer program product of claim 14, wherein the machine-learning process is selected from a group comprising a ridge regression algorithm, a linear regression algorithm, a logistic regression algorithm, a least angle regression algorithm, a neural network, a k-nearest neighbor algorithm, a locally weighted learning algorithm, a Bayesian network, an Apriori algorithm, and a radial basis function network.

* * * * *